(12) United States Patent
Sano

(10) Patent No.: US 7,367,794 B2
(45) Date of Patent: May 6, 2008

(54) HEATING AND COOLING ROLLER

(75) Inventor: Takayoshi Sano, Shizuoka (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 246 days.

(21) Appl. No.: 11/372,182

(22) Filed: Mar. 10, 2006

(65) Prior Publication Data

US 2006/0211556 A1 Sep. 21, 2006

(30) Foreign Application Priority Data

Mar. 17, 2005 (JP) .............................. 2005-077938

(51) Int. Cl.
*B29C 47/88* (2006.01)
(52) U.S. Cl. ...................... 425/471; 425/224; 425/446; 492/16; 492/46
(58) Field of Classification Search ................ 425/224, 425/363, 471, 445, 446; 492/16, 46; 165/65, 165/89
See application file for complete search history.

(56) References Cited

U.S. PATENT DOCUMENTS

| | | | | |
|---|---|---|---|---|
| 2,526,318 | A | * | 10/1950 | Battin .......................... 165/65 |
| 5,945,042 | A | * | 8/1999 | Mimura et al. ............. 425/373 |
| 6,221,301 | B1 | | 4/2001 | Tsunashima et al. |
| 6,568,931 | B2 | * | 5/2003 | Fujii et al. ................... 425/363 |

FOREIGN PATENT DOCUMENTS

| | | |
|---|---|---|
| CN | 1239452 A | 12/1999 |
| JP | 2-25333 | 1/1990 |
| JP | 06-087150 | 3/1994 |

OTHER PUBLICATIONS

Office Action issued in counterpart Chinese Application No. CN 200610059689.0, mailed Dec. 21, 2007.
English language translation of Office Action issued in counterpart Chinese Application No. CN 200610059689.0, mailed Dec. 21, 2007.
English language abstract of JP 2-25333, published Jan. 26, 1990.

* cited by examiner

*Primary Examiner*—James P. Mackey
(74) *Attorney, Agent, or Firm*—DLA Piper US LLP

(57) ABSTRACT

In a cooling roller which cools a molten resin strip discharged from a die, a temperature of a place where a resin comes into contact with the cooling roller, and that of a place where the resin is detached from the cooling roller are individually controlled. The cooling roller comprises: a non-rotatably disposed inner cylinder 11; a rotatable outer cylinder 3 disposed coaxially with the inner cylinder 11; an annular medium channel 13 formed by an outer peripheral surface of the inner cylinder 11 and an inner peripheral surface of the outer cylinder 3; a plurality of small medium channels 73, 75 divided from the medium channel 13 by a plurality of partition members 69, 71; a plurality of medium inflow ports 77, 79 disposed in a wall portion of the inner cylinder along an axis of the inner cylinder 11 so as to communicate with the respective small medium channels 73, 75; and a plurality of slit-like medium outflow ports 81, 83.

3 Claims, 4 Drawing Sheets

HEATING AND COOLING ROLLER

CROSS-REFERENCE TO RELATED APPLICATIONS

This application is based upon and claims the benefit of priority from the prior Japanese Patent Application No. 2005-77938 (filed Mar. 17, 2005); the entire contents of which are incorporated herein by reference.

BACKGROUND OF THE INVENTION

1. Field of the Invention

The present invention relates to a heating and cooling roller, more particularly to a heating and cooling roller which cools a molten resin strip discharged from a die of an extruder or which heats a solidified resin strip.

2. Description of the Related Art

Heretofore, a heating and cooling roller is known which includes: a non-rotatably disposed inner cylinder; a rotatable outer cylinder disposed coaxially with the inner cylinder; an annular medium channel defined by a gap between an outer peripheral surface of the inner cylinder and an inner peripheral surface of the outer cylinder; slit-like medium inflow and outflow ports which are disposed in the inner cylinder and which extend along the approximately whole length of an axis of the inner cylinder; medium supply and discharge paths which are disposed in the inner cylinder to communicate with the medium inflow port and the medium outflow port, respectively, and which supply a medium to the medium inflow port or guide the medium from the medium outflow port to the outside; and a partition member which is disposed between the medium inflow port and the medium outflow port of the inner cylinder to divide the annular medium channel in a peripheral direction and which extends in an axial direction of the inner cylinder (see, e.g., Patent Document 1).

When the heating and cooling roller is used, a temperature distribution of the roller in a width direction can be constantly homogenized, because the slit-like medium inflow and outflow ports are extended along the approximately whole length of the axis of the fixed inner cylinder. This can reduce a lateral temperature fluctuation of a matter to be heated or cooled.

Moreover, since the medium inflow port is disposed in a fixed position, the matter to be heated or cooled first comes into contact with the outer peripheral surface of the outer cylinder constantly maintained at a predetermined temperature, and the matter moves with the rotation of the outer cylinder. Therefore, any temperature unevenness is not generated in a flow direction of the matter to be heated or cooled. Therefore, a flow rate of the medium does not affect the temperature evenness, and the flow rate of the medium can be reduced to reduce the vibrations of the roller and simplify a piping line. In addition, it is possible to control the temperature of the matter to be heated or cooled at the end of contact by controlling not only the medium temperature but also the medium flow rate.

Furthermore, since the medium is supplied from the fixed inner cylinder, there is produced an effect that any rotary joint does not have to be disposed in a medium supply portion.

[Patent Document 1] Japanese Patent Application Laid-Open No. 6-87150

Additionally, in the conventional cooling roller which cools the molten resin strip discharged from the die of the extruder, if a temperature difference can be achieved between a contact start point (the point where the molten resin strip discharged from the die of the extruder comes into contact with the cooling roller) on this cooling roller and a detached point (the point where the strip is detached from the cooling roller) on the cooling roller (outer surface of the outer cylinder), moldability of the molten resin strip is improved.

That is, a higher temperature of the cooling roller is preferred at the place where the molten resin strip discharged from the die comes into contact with the cooling roller. This is because there is improved a close contact property of the molten resin strip with the cooling roller, and there is reduced a temperature difference between a front and a back of the molten resin strip (sheet) in contact with the cooling roller.

On the other hand, a low temperature of the cooling roller is preferred at the detaching place where the resin strip cooled by the cooling roller departs from the cooling roller. This is because crystallization of the resin strip can be inhibited, and peelability of the resin strip from the cooling roller is improved.

However, in the conventional cooling roller, there exists only one medium channel formed by the gap between the outer peripheral surface of the inner cylinder and the inner peripheral surface of the outer cylinder. Therefore, there is a problem that it is not possible to individually control the temperature at the place where the molten resin strip discharged from the die comes into contact with the cooling roller, and the temperature at the parting place where the resin strip discharged from the die of the extruder departs from the cooling roller.

In other words, a conflicting state is caused in which when the temperature of the contact start place is raised, the temperature of the detaching place also rises. On the other hand, when the temperature of the detaching place is raised, the temperature of the contact start place drops. The temperature difference is caused only by the heat received from the molten resin strip. That means that an only small temperature difference (e.g., about 2° C. to 3° C.) is achieved between the temperature at the contact start place and the temperature at the detaching place, and it is difficult to obtain the above-described effects (the close contact property and an improved peelability of strip).

It is to be noted that the above problems arise not only in a case where the molten resin strip discharged from the die of the extruder is cooled but also in the heating roller which heats the solidified resin strip.

SUMMARY OF THE INVENTION

The present invention has been developed in view of the above problems, and an object is to provide a heating and cooling roller which cools a molten resin strip discharged from a die or which heats the solidified resin strip and in which it is possible to individually control a temperature of a place where the resin strip comes into contact with the heating and cooling roller, and a temperature of a place where the resin strip departs from the heating and cooling roller.

The invention of a first aspect is a heating and cooling roller comprising: a non-rotatably disposed inner cylinder; a rotatable outer cylinder disposed coaxially with the inner cylinder; an annular medium channel between an outer peripheral surface of the inner cylinder and an inner peripheral surface of the outer cylinder; a plurality of partition members which extend in an axial direction of the inner cylinder to divide the annular medium channel in a peripheral direction, respectively, thereby dividing the medium channel into a plurality of small medium channels; a plurality of slit-like medium inflow ports in a wall portion of the inner cylinder along an axis of the inner cylinder in different positions of a circumferential direction of the inner cylinder so that the medium inflow ports are connected to the small medium channels, respectively; and a plurality of slit-like medium outflow ports provided in the wall portion of the inner cylinder along the axis of the inner cylinder in different positions of the circumferential direction of the inner cylinder so that the medium outflow ports are connected to the small medium channels, respectively.

The invention of a second aspect is a heating and cooling roller comprising: a non-rotatably disposed inner cylinder; a rotatable outer cylinder disposed coaxially with the inner cylinder; an annular medium channel defined by a gap between an outer peripheral surface of the inner cylinder and an inner peripheral surface of the outer cylinder; a first partition member which extends in an axial direction of the inner cylinder to divide the annular medium channel in a peripheral direction; a second partition member which is spaced apart from the first partition member in a circumferential direction of the inner cylinder and which extends in the axial direction of the inner cylinder to divide the annular medium channel in the peripheral direction; a first small medium channel which is divided from the annular medium channel by one of the partition members; a second small medium channel which is divided from the annular medium channel by another partition member; a first slit-like medium inflow port provided in a wall portion of the inner cylinder along an axis of the inner cylinder so as to be connected to the first small medium channel; a first slit-like medium outflow port provided in the wall portion of the inner cylinder along the axis of the inner cylinder so as to be connected to the first small medium channel; a second slit-like medium inflow port provided in the wall portion of the inner cylinder along the axis of the inner cylinder so as to be connected to the second small medium channel; and a second slit-like medium outflow port provided in the wall portion of the inner cylinder along the axis of the inner cylinder so as to be connected to the second small medium channel.

In the invention of a third aspect, in the heating and cooling roller of the second aspect, throttle portions are formed on an inlet side of each medium inflow port and on an outlet side of each medium outflow port.

Heating and cooling roller according to the present invention which cools a molten resin strip discharged from a die or which heats the solidified resin strip, has an advantage that it is possible to individually control a temperature at a place where the resin strip comes into contact with the heating and cooling roller, and a temperature at a place where the resin strip is detached from the heating and cooling roller.

DETAILED DESCRIPTION OF THE INVENTION

Figure 1:
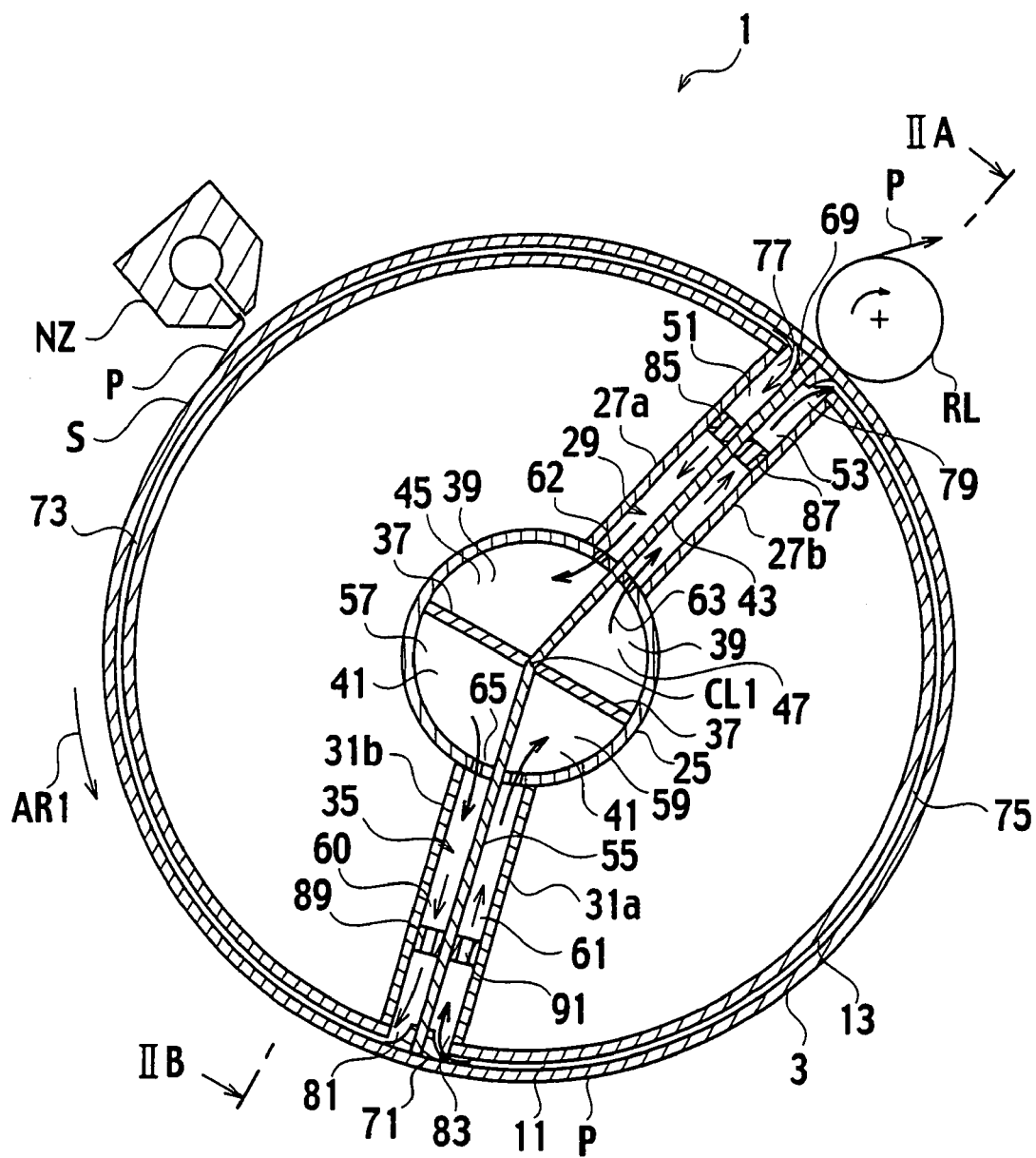
FIG. 1 is a sectional view (sectional view taken along a plane perpendicular to an axis of a roller) showing a schematic constitution of a cooling roller in an embodiment of the present invention.
Figure 2:
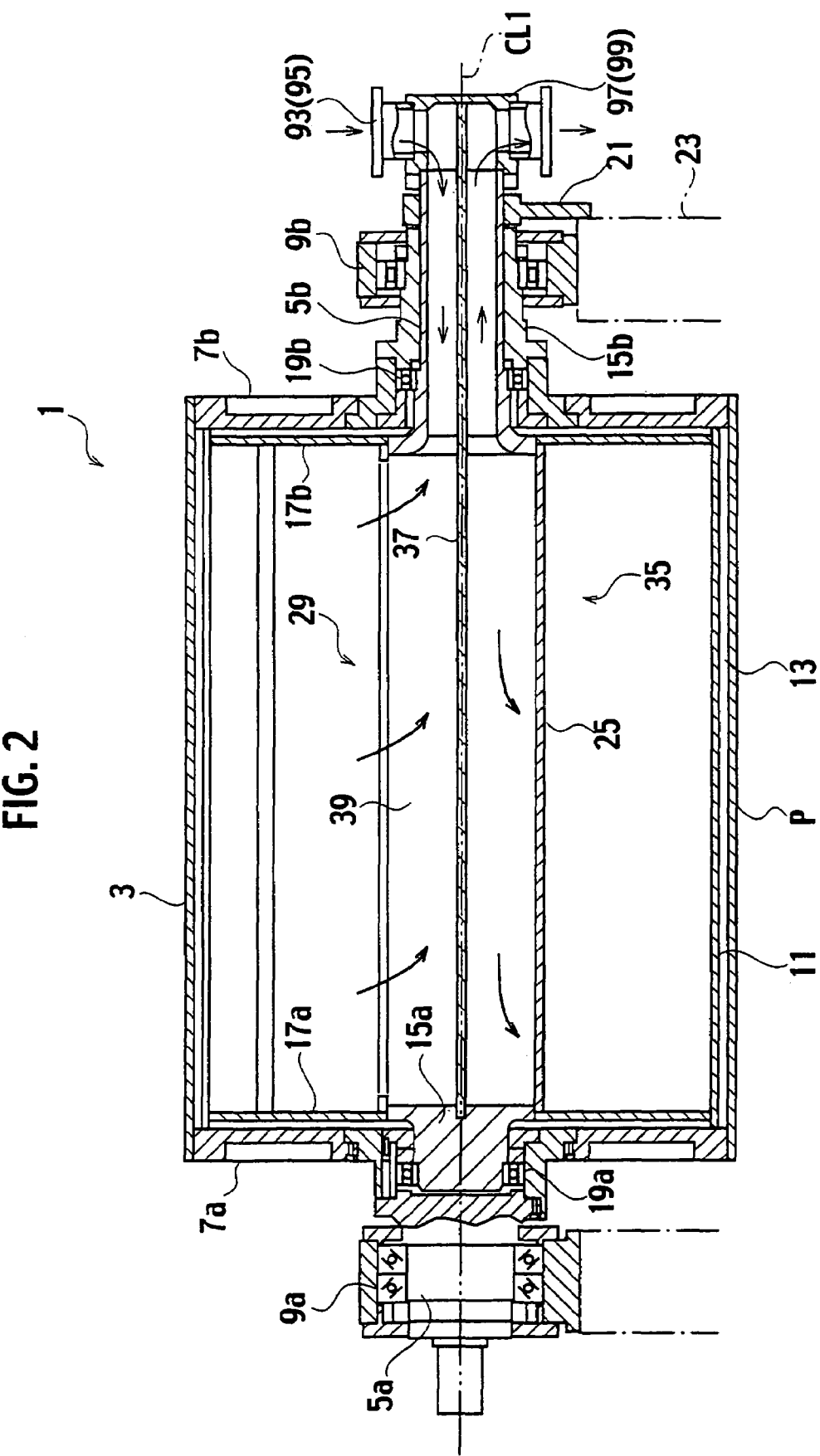
FIG. 2 is a diagram cut along the IIA-IIB arrows of FIG. 1.

FIG. 1 is a sectional view (sectional view by a plane perpendicular to an axis of a roller) showing a schematic constitution of a cooling roller 1 in an embodiment of the present invention, and FIG. 2 is a diagram cut along the IIA-IIB arrows of FIG. 1.

The cooling roller 1 is provided with an outer cylinder 3. End plates 7a, 7b are attached to opposite end portions of this outer cylinder 3, and support shafts 5a, 5b protrude from the respective end plates. The support shafts 5a, 5b are supported by bearings 9a, 9b, respectively. One support shaft 5a is connected to a driving device (e.g., a motor and a speed reducer), and the outer cylinder 3 is rotated about a center axis CL1 by the driving device.

In the outer cylinder 3, an inner cylinder 11 is disposed coaxially with the outer cylinder, and an annular medium (refrigerant) channel 13 is formed by an annular gap between the inner cylinder 11 and the outer cylinder 3. End plates 17a, 17b are attached to opposite end portions of the inner cylinder 11, and shafts 15a, 15b are protruded from the end pates. The shafts 15a, 15b are supported by the end plates 7a, 7b of the outer cylinder 3 via bearings 19a, 19b.

The shaft 15b of the inner cylinder 11 is formed into a hollow shape, the shaft is protruded to the outside through the support shaft 5b of the outer cylinder 3, and a stopper 21 is attached to a protruding portion of the shaft 15b so that the inner cylinder 11 does not rotate with respect to a frame 23.

In the inner cylinder 11, a cylinder (cylinder having a diameter smaller than that of the inner cylinder 11) 25 is disposed coaxially with the inner cylinder 11. The cylinder 25 extends between the opposite end plates 17a, 17b and communicates with the hollow portion of the shaft 15b to form a medium channel. The cylinder 25 is connected to the inner cylinder 11 by two partition walls 27a, 27b extending in a radial direction over approximately the whole length of the inner cylinder 11 in the axial direction, and two partition walls 31a, 31b similarly extending in a radial direction over approximately the whole length of the inner cylinder 11 in the axial direction.

Moreover, the two partition walls 27a, 27b are disposed in parallel with each other at a predetermined distance therebetween, and a radial-direction medium channel 29 is formed between two partition walls 27a, 27b. A radial-direction medium channel 35 is similarly formed between two partition walls 31a, 31b.

It is to be noted that one of the intersecting angles between the radial-direction medium channels 29 and 35 is an obtuse angle slightly smaller than, for example, 180°. This angle may be changed depending on a system which is an object, without departing from the scope of the present invention.

Moreover, the hollow portions of the cylinder 25 and the shaft 15b are partitioned into an upper space 39 and a lower space 41 by a partition plate 37 including the axis CL1 of the inner cylinder 11 and extending in a direction substantially bisecting the obtuse angle.

Furthermore, the radial medium channel 29 and the upper space 39 are partitioned into an upper left space 45 and an upper right space 47 by a partition plate 43 which includes the axis CL1 of the inner cylinder 11 and extends in the same direction as the partition walls 27a, 27b in the radial-direction medium channel 29 and the upper space 39, so that a first medium discharge path 51 and a second medium supply path 53 are formed.

Similarly, the radial-direction medium channel 35 and the lower space 41 are partitioned into a lower left space 57 and a lower right space 59 by a partition plate 55 which includes the axis CL1 of the inner cylinder 11 and extends in the same direction as the partition walls 31a, 31b in the radial-direction medium channel 35 and the lower space 41, so that a first medium supply path 60 and a second medium discharge path 61 are formed.

Thus, the hollow portion of the shaft 15b is partitioned into the first medium discharge path 51, the second medium supply path 53, the first medium supply path 60, and the second medium discharge path 61 by the respective partition plates 37, 43, and 55. The inner space of the cylinder 25 is also partitioned into the first medium discharge path 51, the second medium supply path 53, the first medium supply path 60, and the second medium discharge path 61 by the respective partition plates 37, 43, and 55.

Furthermore, the radial medium channel 29 is partitioned into the first medium discharge path 51 and the second medium supply path 53 by the partition plate 43, and the radial medium channel 35 is partitioned into the first medium supply path 60 and the second medium discharge path 61 by the partition plate 55.

It is to be noted that the first medium discharge path 51 disposed in the radial medium channel 29 communicates with the first medium discharge path 51 disposed in the cylinder 25 via a through hole 62 disposed in the cylinder 25.

Similarly, the other medium supply or discharge paths communicate with each other via through holes 63, 65, and 67 disposed in the cylinder 25.

According to such constitution, at least a part of the respective medium supply paths 53, 60 and the respective medium discharge path 51, 61 is disposed in the inner cylinder 11.

Additionally, the annular medium channel 13 is divided into a first small medium channel 73 and a second small medium channel 75 by a first partition member 69 which extends along the approximately whole length of the inner cylinder 11 in the axial direction to divide the medium channel 13 in a peripheral direction, and a second partition member 71 which is spaced apart from the first partition member 69 in a circumferential direction of the inner cylinder 11 and which extends along the approximately whole length of the inner cylinder 11 in the axial direction to divide the medium channel 13 in the peripheral direction. Each of the small medium channels 73, 75 has an arcuate form as viewed on a plane perpendicular to the axis of the inner cylinder 11.

The first partition member 69 is disposed in an outer end (portion on the side of the outer cylinder 3) of the partition plate 43, and the second partition member 71 is disposed in an outer end of the partition plate 55.

Moreover, as shown in FIG. 1, a portion of the inner cylinder 11 on one side (one side of the inner cylinder 11 in the peripheral direction: left side of FIG. 1) of the second partition member 71, is provided with a first medium inflow port 81 for supplying a medium from the first medium supply path 60 to the first small medium channel 73 so as to communicate with the first small medium channel 73. It is to be noted that the first medium inflow port 81 is formed into a slit shape in a wall portion of the inner cylinder 11 extending over approximately whole length of the inner cylinder 11 along the axis of the inner cylinder 11.

Similarly, a portion of the inner cylinder 11 on the other side (right side of FIG. 1) of the second partition member 71, is provided with a second medium outflow port (medium inflow port constituted in the same manner as in the first medium inflow port 81) 83 for discharging the medium supplied from the second medium supply path 53 to the second small medium channel 75 so as to communicate with the second small medium channel 75.

Similarly, a first medium outflow port 77 is disposed on the left side (left side of FIG. 1) of the first partition member 69, and a second medium inflow port 79 is disposed on the right side (right side of FIG. 1).

In addition, the outer cylinder 3 rotates in a direction (counterclockwise direction) of the arrow AR1 shown in FIG. 1 about the center axis CL1 of the inner cylinder 11. A nozzle NZ which injects a molten resin strip P is disposed on a downstream side of the outer cylinder 3 in a rotation direction with respect to the first partition member 69. The resin strip (sheet-like resin having a predetermined width in a direction perpendicular to a drawing sheet of FIG. 1) P is supplied to the cooling roller 1 in the vicinity of this nozzle NZ. Moreover, the supplied resin P is moved and cooled with the rotation of the outer cylinder 3.

Moreover, the second partition member 71 is disposed downstream of the nozzle NZ in the rotation direction on the outer cylinder 3. A windup roller RL which winds up the resin strip P cooled by the cooling roller 1 is disposed downstream of the second partition member 71 in the rotation direction on the outer cylinder 3, and the resin strip P is detached from the cooling roller 1 in the vicinity of the windup roller RL.

According to such constitution, the second medium inflow port 79, the first partition member 69, and the first medium outflow port 77 are arranged adjacent to one another in order from an upstream side of the outer cylinder 3 in the rotation direction on an upstream side of a supply position in the rotation direction of the outer cylinder 3 between the supply position of the resin strip P to be cooled to the outer cylinder 3 and a detaching position of the resin strip P from the outer cylinder 3.

Moreover, the first medium inflow port 81, the second partition member 71, and the second medium outflow port 83 are disposed adjacent to one another in order from the upstream side of the outer cylinder 3 in the rotation direction on the downstream side of the supply position in the rotation direction of the outer cylinder 3 between the supply position and the detaching position.

In the cooling roller 1, as shown in FIG. 1, the partition plate 43 (the first partition member 69, the first medium outflow port 77, and the second medium inflow port 79) is disposed in the detaching position (the windup roller RL). According to such constitution, a temperature of the cooling roller 1 (outer cylinder 3) is easily raised in a supply position S of the resin to the cooling roller.

Moreover, a throttle portion 85 is disposed in the first medium discharge path 51 formed between the inner cylinder 11 and the cylinder 25, and throttle portions 87, 89, and 91 are similarly disposed in the second medium supply path 53, the first medium supply path 60, and the second medium discharge path 61 respectively.

It is to be noted that in another arrangement, at least one of the respective throttle portions 85, 87, 89, and 91 may be used.

A distal end of the shaft 15b is provided with: a first medium outlet flange 93 which communicates with the first medium discharge path 51; a second medium inlet flange 95 which communicates with the second medium supply path

53; a first medium inlet flange 97 which communicates with the first medium supply path 60; and a second medium outlet flange 99 which communicates with the second medium discharge path 61.

Moreover, when a cooling medium is supplied from the first medium inlet flange 97 to the first medium supply path 60, the supplied cooling medium is introduced into the first small medium channel 73 over the whole length of this channel via the first medium supply path 60.

The cooling medium flows in the peripheral direction through the first small medium channel 73 to cool the molten resin welded to the outer peripheral surface of the outer cylinder 3 via the outer cylinder. Thereafter, the medium passes through the first medium discharge path 51, and is discharged to the outside form the first medium outlet flange 93.

Similarly, the medium supplied from the second medium inlet flange 95 flows through the second small medium channel 75, and is discharged from the second medium outlet flange 99 to the outside.

It is to be noted that the temperature of the refrigerant supplied from the first medium inlet flange 97 is, for example, 1000° C., and the temperature of the refrigerant supplied from the second medium inlet flange 95 is, for example, 30° C.

In the cooling roller 1, the medium is uniformly introduced from the whole width (whole length in the axial direction) of the roller (outer cylinder 3) into the medium channel owing to pressure losses of the respective throttle portions 85, 87, 89, and 91 and shock functions (buffer functions) in the respective medium supply and discharge paths. Therefore, the temperature is uniform over the approximately whole width of the outer cylinder brought into contact with the molten resin, and any temperature unevenness is not generated in the width direction of a resin film which is a matter to be cooled.

Moreover, the medium inflow ports 81, 83 or the medium outflow ports 77, 83 are constantly fixed in certain positions with respect to the nozzle NZ. Therefore, the temperature of the outer cylinder 3 is held at a substantially equal temperature in the peripheral direction in a position where the matter to be cooled (molten resin) comes into contact with the outer surface of the outer cylinder. Therefore, any temperature unevenness is not generated in the width direction of the matter to be cooled.

Furthermore, the temperature of the outer cylinder 3 is constantly equal in a point in which the matter to be cooled comes into contact with the outer cylinder 3. Therefore, for example, even when a difference between an inlet temperature and an outlet temperature increases, the difference does not cause the temperature unevenness in the width direction and a flow direction of the matter to be cooled. The temperature difference does not have to be necessarily reduced, and a flow rate of the medium can be decreased.

In addition, according to the cooling roller 1, it is possible to obtain an effect of the conventional cooling roller as described above. Moreover, since there exist two medium channels, it is possible to individually control the temperature of the place (supply position) where the resin strip comes into contact with the outer roller (outer surface of the outer cylinder 3), and the temperature of the place (detaching position) where the resin strip is detached from the cooling roller. It is possible to make a temperature difference between the supply position and the detaching position, and moldability of the molten resin strip can be improved.

That is, since the temperature of the cooling roller (outer surface of the outer cylinder 3) is raised in the supply position, a close contact property of the molten resin strip with the cooling roller can be improved. Furthermore, it is possible to reduce a temperature difference between front and back of the molten resin strip (sheet) brought into contact with the cooling roller.

Moreover, since the temperature of the cooling roller is lowered in the detaching position, it is possible to inhibit crystallization of the resin strip, and it is also possible to improve peelability of the resin strip from the cooling roller.

Here, there will be described a test result at a time when the cooling roller 1 is operated.

Figure 3:
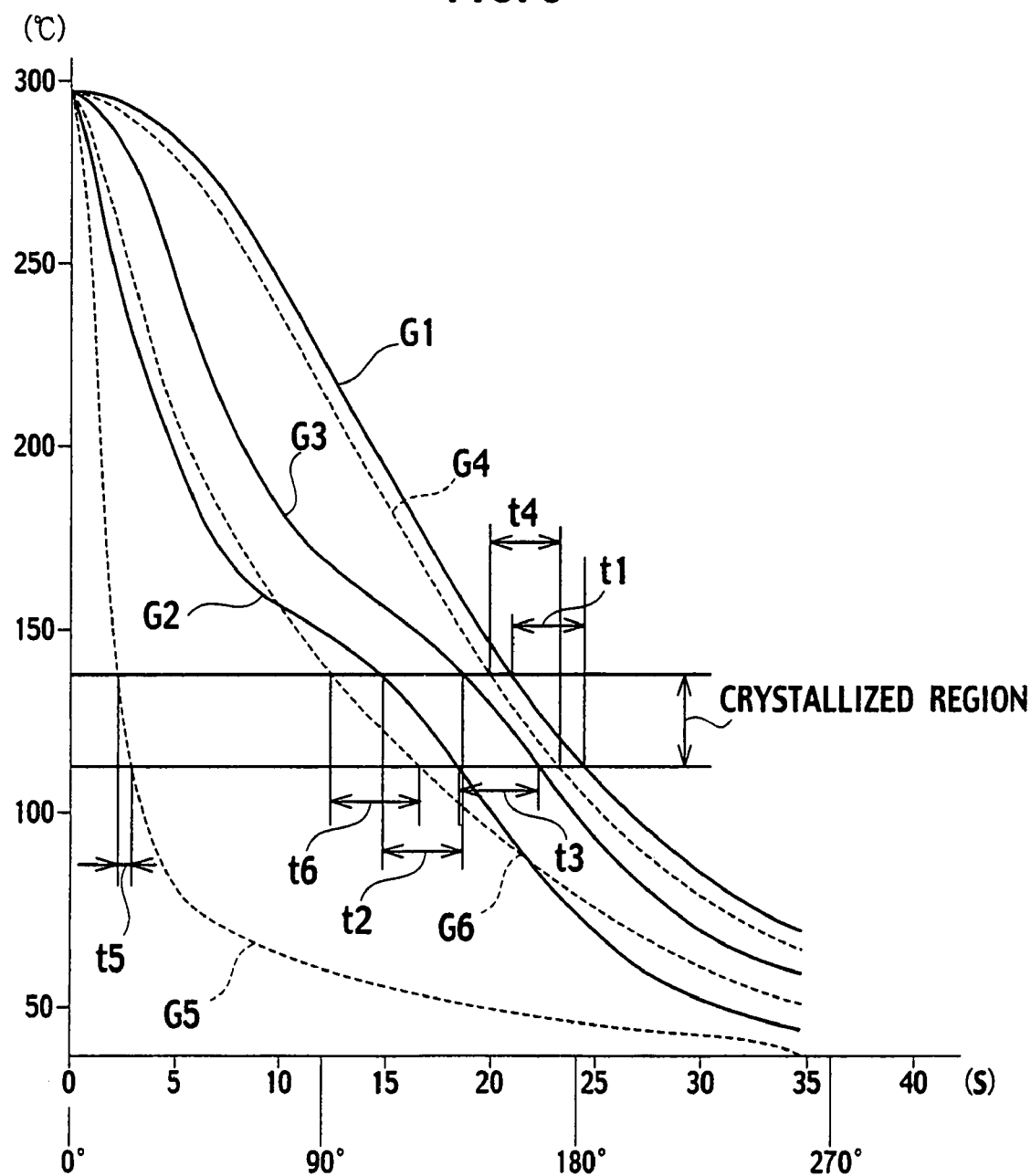
FIG. 3 is a diagram showing a test result at a time when the cooling roller is operated.

FIG. 3 is a diagram showing the test result at the time when the cooling roller 1 is operated.

The abscissa of FIG. 3 shows an angle centering on the center axis CL1. Assuming that a place where the nozzle NZ is disposed in FIG. 1 is "0°", the angle increases counterclockwise, and an angle of a place where the second partition member 71 is disposed is approximately "110°". Since the outer cylinder 3 rotates at a certain angular speed, the abscissa of FIG. 3 can be regarded as a time axis. The ordinate of FIG. 3 shows the temperature of the resin strip.

Moreover, a PET resin was used as the resin strip in the outer cylinder 3 having an outer diameter of 2000 mm, a thickness of the resin strip was set to 1900 μm, the temperature of the medium supplied from the first medium inflow port 81 was set to 130° C., and the temperature of the medium supplied from the second medium inflow port 79 was set to 27° C., when a test was carried out. Room temperature was 35° C. A surface temperature of the cooling roller 1 (outer cylinder 3) in a point S shown in FIG. 1 was 70° C., and a close contact degree of a resin film (resin strip) with the outer cylinder 3 was improved.

A graph G1 shown in FIG. 3 is a graph showing a temperature of a front face (face of the resin strip opposite the face thereof which comes into contact with the outer cylinder 3) of the resin strip. It is shown that the temperature of the face of the resin discharged from the nozzle NZ is about 285° C., and the temperature drops as the resin is detached from the nozzle NZ by the rotation of the outer cylinder 3.

A graph G2 is a graph showing a temperature of a roller-side face (face of the resin strip which comes into contact with the outer cylinder 3) of the resin strip. It is shown that the temperature of the face of the resin discharged from the nozzle NZ is about 285° C., and the temperature rapidly drops down to about 150° C. as compared with the front face of the resin in the beginning (the vicinity of the second partition member 71) as the resin is detached from the nozzle NZ by the rotation of the outer cylinder 3. The temperature slowly drops around a place provided with the second partition member 71 (around a temperature of 150° C.).

A graph G3 shows average values of the graphs G1 and G2.

A graph G4 is a graph showing the temperature of the front face of the resin strip in a case where a test similar to the above test is performed using the conventional cooling roller. It is to be noted that the temperature of the resin supplied to the conventional cooling roller is about 30° C.

A graph G5 is a graph showing a temperature of a roller-side face of the resin strip in a case where a test similar to the above test is performed. It is shown that the temperature of the face of the resin discharged from the nozzle NZ is about 285° C., and the temperature rapidly drops (down to about 70° C.) as compared with the front face of the resin in the beginning (the vicinity of the nozzle NZ) as the resin is detached from the nozzle NZ by the rotation of the outer cylinder 3.

A graph G6 shows average values of the graphs G3 and G4.

As understood from the respective graphs, a temperature difference between the graphs G1 and G2 is smaller than that between the graphs G4 and G5. Therefore, in the cooling roller 1 of the present embodiment, the temperature difference between the front face and the roller-side face of the resin strip is smaller than that in the conventional cooling roller, and a texture of the resin strip can be homogenized more than before.

Moreover, the crystallization of the resin strip occurs at a temperature of 120° C. to 130° C., but the temperature rapidly drops in the graph G5. Therefore, a time t5 to pass the temperature of 120° C. to 130° C. shortens.

On the other hand, in the graph G4, a time t4 to pass the temperature of 120° C. to 130° C. lengthens to a certain degree. Therefore, the crystallization hardly occurs in the roller-side face of the resin strip, the crystallization occurs to a certain degree in the front face of the resin strip, and the texture changes in a thickness direction of the resin strip in the conventional cooling roller.

In the graphs G1, G2, and G3, a mutual difference among times t1, t2, and t3 to pass the temperature of 120° C. to 130° C. is reduced.

Therefore, when the cooling roller 1 is used, the crystallization similar occurs in the thickness direction of the resin strip, and the texture of the resin strip can be set to be constant in the thickness direction of the resin.

Figure 4:
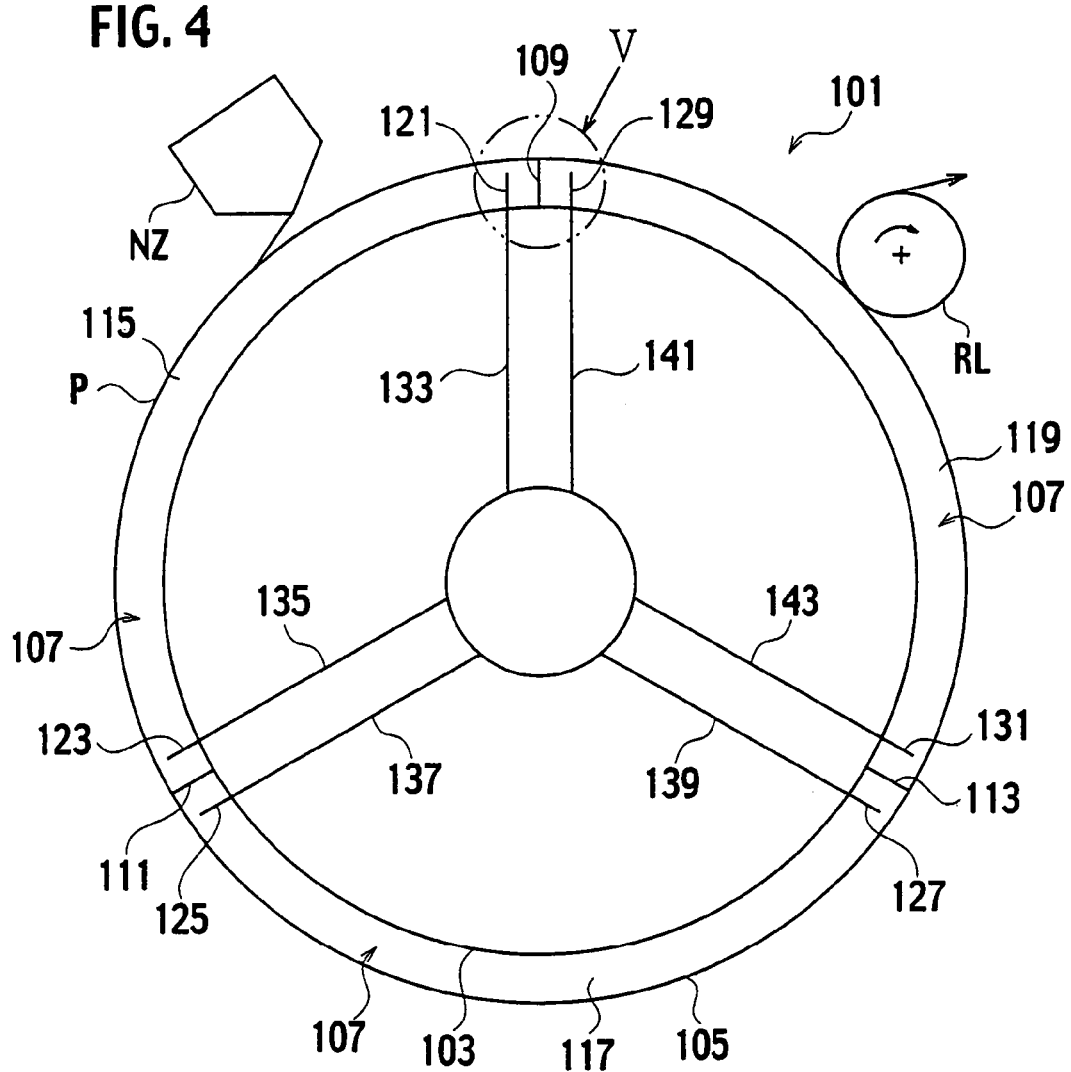
FIG. 4 is a schematic view showing a schematic constitution of the cooling roller provided with three medium channels.

In addition, in the cooling roller 1, positions of the first medium inflow port 81 and the first medium outflow port 77 may be reversed, and those of the second medium inflow port 79 and the second medium outflow port 83 may be reversed. Furthermore, the cooling roller 1 is provided with two small medium channels (two lines of medium channels), but as shown in FIG. 4 (diagram showing a schematic constitution of a cooling roller 101 provided with three lines of medium channels), the constitution may be provided with three lines of medium channels.

That is, the cooling roller 101 includes: a non-rotatably disposed inner cylinder 103; and a rotatable outer cylinder 105 disposed coaxially with the inner cylinder 103.

An annular medium channel 107 is formed by a gap between an outer peripheral surface of the inner cylinder 103 and an inner peripheral surface of the outer cylinder 105, and this medium channel 107 is divided in a peripheral direction by partition members 109, 111, and 113 extended in an axial direction of the inner cylinder 103. It is to be noted that the partition members 109, 111, and 113 are spaced from one another in a rotation direction of the outer cylinder 105, and the partition members 109, 111, and 113 are arranged in this order.

The annular medium channel 107 is defined by the partition members 109 and 111 to form a first small medium channel 115. Similarly, the partition members 111 and 113 form a second small medium channel 117, and the partition members 113 and 109 form a third small medium channel 119. According to such constitution, the first small medium channel 115, the second small medium channel 117, and the third small medium channel 119 are arranged in order in a rotation direction of the outer cylinder 105.

A first slit-like medium inflow port 123 and a first slit-like medium outflow port 121 are disposed in a wall portion of the inner cylinder 103 along an axis of the inner cylinder 103 so as to communicate with the first small medium channel 115.

A second medium inflow port 127 and a second medium outflow port 125 are similarly disposed so as to communicate with the second small medium channel 117, and a third medium inflow port 129 and a third medium outflow port 131 are disposed so as to communicate with the third small medium channel 119.

Moreover, in the inner cylinder 103, there are arranged: a first medium supply path 135 for supplying a medium to the first medium inflow port 123; a first medium discharge path 133 for deriving the medium from the first medium outflow port 121 to the outside; a second medium supply path 139 for supplying the medium to the second medium outflow port 125; a second medium discharge path 137 for deriving the medium from the second medium outflow port 125 to the outside; a third medium supply path 141 for supplying the medium to the third medium inflow port 129; and a third medium discharge path 143 for deriving the medium from the third medium outflow port 131 to the outside.

Furthermore, for example, the third medium inflow port 129, the first partition member 109, and the first medium outflow port 121 are arranged adjacent to one another in order from an upstream side of the outer cylinder 105 in the rotation direction on an upstream side of a supply position in the rotation direction of the outer cylinder 105 between the supply position of a resin strip to be cooled to the outer cylinder 105 and a detaching position of the resin strip from the outer cylinder 105.

Moreover, the first medium inflow port 123, the second partition member 111, and the second medium outflow port 125 (may be the second medium inflow port) are arranged adjacent to one another in order from the upstream side of the outer cylinder 105 in the rotation direction on a downstream side of the supply position in the rotation direction of the outer cylinder 105 between the supply position and the detaching position.

Furthermore, the second medium inflow port 127 (may be the second medium outflow port), the third partition member 113, and the third medium outflow port 131 are arranged adjacent to one another in order from the upstream side of the outer cylinder 105 in the rotation direction on the downstream side of the second medium outflow port 125 in the rotation direction of the outer cylinder 105 between the supply position and the detaching position.

Figure 5:
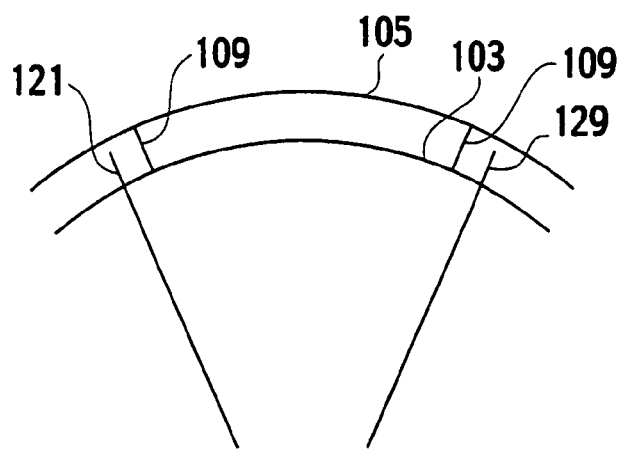
FIG. 5 shows a modification of the cooling roller and corresponding to the V part of FIG. 4.

It is to be noted that as shown in FIG. 5 (diagram showing a modification of the cooling roller and corresponding to the V part shown in FIG. 4), the third medium inflow port 129 may be largely spaced from the first medium outflow port 121.

Furthermore, the constitution may be provided with four or more lines of medium channels.

That is, the constitution may be provided with: a non-rotatably disposed inner cylinder; a rotatable outer cylinder disposed coaxially with the inner cylinder; an annular medium channel defined by a gap between an outer peripheral surface of the inner cylinder and an inner peripheral surface of the outer cylinder; a plurality of partition members which extend respectively in an axial direction of the inner cylinder to divide the annular medium channel in a peripheral direction, thereby dividing the medium channel into a plurality of small medium channels (each medium channel has a circular sectional shape by a plane perpendicular to an axis of the inner cylinder); a plurality of slit-like medium inflow ports provided in a wall portion of the inner cylinder along the axis of the inner cylinder in different positions of a circumferential direction of the inner cylinder so that the medium inflow ports are connected to the small medium channels, respectively; a plurality of slit-like medium outflow ports provided in the wall portion of the inner cylinder along the axis of the inner cylinder in different positions of the circumferential direction of the inner cylinder so that the medium outflow ports are connected to the small medium channels, respectively; a plurality of medium supply paths disposed in the inner cylinder so as to supply a medium to each medium inflow port; and a plurality of medium discharge paths disposed in the inner cylinder so as to discharge the medium from each medium outflow port to the outside.

It is to be noted that in the above embodiments, the present invention has been used as the cooling roller, but the present invention may be used as a heating roller, that is, a constitution which supplies a medium to be heated to a medium channel of the roller and which heats a sheet-like material brought into contact with an outer periphery of an outer cylinder.

What is claimed is:

1. A heating and cooling roller comprising:
a non-rotatable inner cylinder;
a rotatable outer cylinder disposed coaxially with the inner cylinder;
an annular medium channel between an outer peripheral surface of the inner cylinder and an inner peripheral surface of the outer cylinder;
a plurality of partition members, each of which extending in an axial direction of the inner cylinder to divide the annular medium channel in a peripheral direction, thereby dividing the medium channel into a plurality of small medium channels;
a plurality of slit-like medium inflow ports provided in a wall portion of the inner cylinder along an axis of the inner cylinder at different circumferential positions on the inner cylinder so that the medium inflow ports are connected to the small medium channels, respectively; and
a plurality of slit-like medium outflow ports provided in the wall portion of the inner cylinder along the axis of the inner cylinder at different circumferential positions on the inner cylinder so that the medium outflow ports are connected to the small medium channels, respectively.

2. A heating and cooling roller comprising:
a non-rotatable inner cylinder;
a rotatable outer cylinder disposed coaxially with the inner cylinder;
an annular medium channel between an outer peripheral surface of the inner cylinder and an inner peripheral surface of the outer cylinder;
a first partition member which extends in an axial direction of the inner cylinder so as to divide the annular medium channel in a peripheral direction;
a second partition member which is circumferentially spaced from the first partition member of the inner cylinder and which extends in the axial direction of the inner cylinder so as to divide the annular medium channel in the peripheral direction;
a first small medium channel which is divided from the annular medium channel by one of the partition members;
a second small medium channel which is divided from the annular medium channel by the other one of the partition members;
a first slit-like medium inflow port provided in a wall portion of the inner cylinder along an axis of the inner cylinder so as to be connected to the first small medium channel;
a first slit-like medium outflow port provided in the wall portion of the inner cylinder along the axis of the inner cylinder so as to be connected to the first small medium channel;
a second slit-like medium inflow port provided in the wall portion of the inner cylinder along the axis of the inner cylinder so as to be connected to the second small medium channel; and
a second slit-like medium outflow port provided in the wall portion of the inner cylinder along the axis of the inner cylinder so as to be connected to the second small medium channel.

3. The heating and cooling roller according to claim 2, wherein a throttle portion is formed on an inlet side of each of the medium inflow ports and on an outlet side of each of the medium outflow ports.

* * * * *